United States Patent
Onen et al.

(10) Patent No.: US 9,275,277 B2
(45) Date of Patent: Mar. 1, 2016

(54) USING A COMBINATION OF 2D AND 3D IMAGE DATA TO DETERMINE HAND FEATURES INFORMATION

(71) Applicant: Kaiser Foundation Hospitals, Oakland, CA (US)

(72) Inventors: Cengiz Onen, Dublin, CA (US); Shruti Krishnagiri, Fremont, CA (US)

(73) Assignee: Kaiser Foundation Hospitals, Oakland, CA (US)

( * ) Notice: Subject to any disclaimer, the term of this patent is extended or adjusted under 35 U.S.C. 154(b) by 183 days.

(21) Appl. No.: 13/774,326

(22) Filed: Feb. 22, 2013

(65) Prior Publication Data

US 2014/0241570 A1 Aug. 28, 2014

(51) Int. Cl.
*G06K 9/00* (2006.01)
*G06F 3/01* (2006.01)

(52) U.S. Cl.
CPC ............ *G06K 9/00389* (2013.01); *G06F 3/017* (2013.01); *G06K 9/00201* (2013.01); *G06K 9/00355* (2013.01); *G06K 2209/21* (2013.01); *G06T 2207/30196* (2013.01)

(58) Field of Classification Search
CPC .......... G06K 9/00201; G06K 9/00355; G06K 9/00389; G06K 2209/21; G06T 2207/30196; G06F 3/017
See application file for complete search history.

(56) References Cited

U.S. PATENT DOCUMENTS

| | | | |
|---|---|---|---|
| 5,767,842 A | 6/1998 | Korth | |
| 6,359,612 B1 | 3/2002 | Peter et al. | |
| 6,512,838 B1 | 1/2003 | Rafii et al. | |
| 7,095,401 B2 | 8/2006 | Liu et al. | |
| 7,308,112 B2 * | 12/2007 | Fujimura et al. | 382/103 |
| 7,996,793 B2 * | 8/2011 | Latta et al. | 715/864 |
| 8,175,333 B2 * | 5/2012 | Eaton et al. | 382/103 |
| 8,520,901 B2 * | 8/2013 | Nishimoto et al. | 382/107 |
| 8,730,157 B2 * | 5/2014 | Sankarasubramaniam et al. | 345/156 |
| 8,751,215 B2 * | 6/2014 | Tardif | 704/3 |
| 8,787,663 B2 * | 7/2014 | Litvak et al. | 382/165 |

(Continued)

FOREIGN PATENT DOCUMENTS

DE 102007028645 A1 1/2009
WO WO-2011/146798 A1 11/2011

OTHER PUBLICATIONS

Van den Bergh et al., "Combining RGB and ToF Cameras for Real-time 3D Hand Gesture Interaction" 2011, Applications of Computer Vision (WACV), 2011 IEEE Workshop on, 66-72.*

(Continued)

*Primary Examiner* — Katrina Fujita
(74) *Attorney, Agent, or Firm* — Mauriel Kapouytian Woods LLP; Ararat Kapouytian (57) ABSTRACT

A method of determining hand features information using both two dimensional (2D) image data and three dimensional (3D) image data is described. In one implementation, a method includes: receiving a 2D image frame; receiving 3D image data corresponding to the 2D image frame; using the 3D image data corresponding to the 2D image frame, transforming the 2D image frame; and using the 3D image data corresponding to the 2D image frame, scaling the 2D image frame, where the transforming and scaling results in a normalized 2D image frame, where the normalized 2D image frame is a scaled and transformed version of the 2D image frame, and where the scaling and transforming is performed using a computer.

22 Claims, 8 Drawing Sheets

(56) References Cited

U.S. PATENT DOCUMENTS

| | | | |
|---|---|---|---|
| 8,897,491 B2* | 11/2014 | Ambrus et al. | 382/103 |
| 8,998,718 B2* | 4/2015 | Inagaki et al. | 463/37 |
| 9,002,099 B2* | 4/2015 | Litvak et al. | 382/154 |
| 2009/0315740 A1 | 12/2009 | Hildreth et al. | |
| 2010/0066676 A1 | 3/2010 | Kramer et al. | |
| 2010/0197399 A1* | 8/2010 | Geiss | 463/32 |
| 2010/0199228 A1 | 8/2010 | Latta et al. | |
| 2011/0305398 A1* | 12/2011 | Sakakibara | 382/203 |
| 2012/0119985 A1* | 5/2012 | Kang | 345/156 |
| 2013/0243313 A1* | 9/2013 | Civit et al. | 382/164 |
| 2013/0278504 A1* | 10/2013 | Tong et al. | 345/158 |
| 2013/0335318 A1* | 12/2013 | Nagel et al. | 345/156 |
| 2013/0336524 A1* | 12/2013 | Zhang et al. | 382/103 |
| 2014/0049465 A1* | 2/2014 | Tremaine et al. | 345/156 |

OTHER PUBLICATIONS

Li et al., "Robust Depth Camera Based Eye Localization for Human-Machine Interactions", 2011, Knowledge-Based and Intelligent Information and Engineering Systems Lecture Notes in Computer Science vol. 6881, 424-435.*

Bleiweiss et al., "Fusing Time-of-Flight Depth and Color for Real-Time Segmentation and Tracking", 2009, Dynamic 3D Imaging Lecture Notes in Computer Science vol. 5742, 58-69.*

Cui et al., "Robust Hand Tracking with Refined CAMShift Based on Combination of Depth and Image Features", Dec. 2012, Robotics and Biomimetics (ROBIO), 2012 IEEE International Conference on, 1355-1361.*

Dal Mutto et al., "Time-of-Flight Cameras and Microsoft Kinect™", 2012, SpringerBriefs in Electrical and Computer Engineering.*

Ren et al., "Robust Hand Gesture Recognition Based on Finger-Earth Mover's Distance with a Commodity Depth Camera", 2011, Proceeding MM '11 Proceedings of the 19th ACM international conference on Multimedia, 1093-1096.*

Suau et al., "Real-Time Head and Hand Tracking Based on 2.5D Data", Jun. 2012, IEEE Trans on Multimedia, vol. 14, No. 3, 575-584.*

Fritzke, B., "A Growing Neural Gas Network Learns Topologies," Advances in Neural Information Processing Systems 7, 1995, pp. 625-632, vol. 7, MIT Press, Cambridge MA.

"Game Console Technology in the Operating Room," Siemens AG, 1996-2012, pp. 1-2, www.siemens.com.

Stergiopoulou, E. et al., "Hand Gesture Recognition Using a Neural Network Shape Fitting Technique," Engineering Applications of Artificial Intelligence, 2009, pp. 1141-1158, vol. 22, Elsevier Ltd.

Yoruk, E. et al., "Shape-Based Hand Recognition," IEEE Transactions on Image Processing, Jul. 2006, pp. 1803-1815, vol. 15, No. 7.

Davidson, I., "Understanding K-Means Non-hierarchical Clustering," SUNY Albany—Technical Report 02-2, 5 pages. 2002.

Hartley, R. et al., "Projective Geometry and Transformations of 2D," Multiple View Geometry in Computer Vision, 2003, pp. 25-64, Second Edition, Cambridge Univerisity Press.

Hartley, R. et al., "Estimation—2D Projective Transformations," Multiple View Geometry in Computer Vision, 2003, pp. 87-131, Second Edition, Cambridge Univerisity Press.

* cited by examiner

USING A COMBINATION OF 2D AND 3D IMAGE DATA TO DETERMINE HAND FEATURES INFORMATION

BACKGROUND

Existing methods of determining hand and hand component locations involve the use of either a three dimensional (3D) image sensor (e.g., a depth camera) alone or a two dimensional image sensor (e.g., a red green blue (RGB) camera) alone. Each of these methods has its own drawbacks. For example, using a 3D image sensor alone to determine hand and hand component locations can be slow. On the other hand, using a 2D image sensor alone can be unreliable.

SUMMARY

Embodiments of the present invention use a combination of 2D and 3D image data to determine hand features information. Using such a combination helps overcome some of the disadvantages of using 2D image data alone or 3D image data alone. Using the 3D image data provides more reliable data, whereas using the 2D image data allows for a faster determination of hand features information. Accordingly, using the combination allows for faster determination of hand features information in a more reliable manner.

In one implementation, an embodiment of the present invention is directed to a method including: receiving a 2D image frame; receiving 3D image data corresponding to the 2D image frame; using the 3D image data corresponding to the 2D image frame, transforming the 2D image frame; and using the 3D image data corresponding to the 2D image frame, scaling the 2D image frame, where the transforming and scaling results in a normalized 2D image frame, where the normalized 2D image frame is a scaled and transformed version of the 2D image frame, and where the scaling and transforming is performed using a computer. In one embodiment, the 3D image data corresponding to the 2D image frame is (a) skeletal tracking information corresponding to the 2D image frame or (b) a 3D image frame corresponding to the 2D image frame.

BRIEF DESCRIPTION OF THE DRAWINGS

The novel features of the invention are set forth in the appended claims. However, for purpose of explanation, several aspects of particular embodiments of the invention are described by reference to the following figures.

DETAILED DESCRIPTION

The following description is presented to enable any person skilled in the art to make and use embodiments of the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
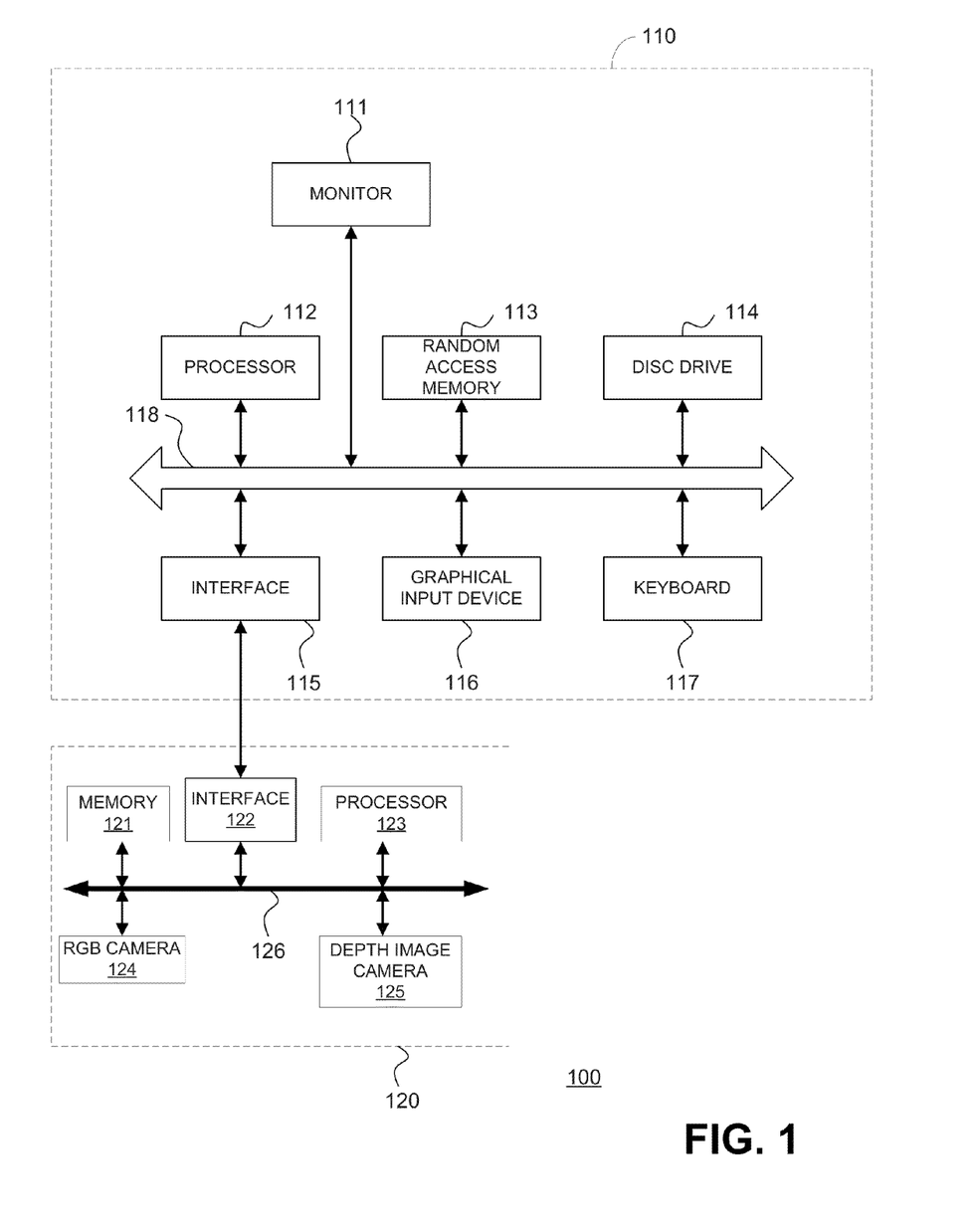
FIG. 1 is block diagram of an embodiment of a system for performing embodiments of methods of the present invention.

FIG. 1 is block diagram of an embodiment of a system for performing embodiments of methods of the present invention. System 100 includes a computer 110 and an image capturing device 120. Furthermore, as explained further below, system 100 includes computer executable code (also referred to as a computer program or computer program code), which when executed on a computer or computer system, cause the computer or computer system to perform embodiments of the methods of the present invention.

In one embodiment, computer 110 includes monitor 111, processor 112, random access memory (RAM) 113, disk drive 114, interface 115, graphical input device 116, keyboard 117, and bus 118. As can be seen in FIG. 1, bus 118 interconnects elements of computer 110.

In one embodiment, the graphical input device 116 includes a computer mouse, a trackball, a track pad, graphics tablet, touch screen, and/or other wired or wireless input devices that allow users to create or select graphics, objects, icons, and/or text appearing on the monitor 111. In one embodiment, interface 115 is a universal serial bus (USB) interface. In one embodiment, interface 115 is a network interface. Interface 115 may be a wired or wireless interface device. In one embodiment, interface 115 provides wired or wireless communication with an electronic communications network, such as a local area network, a wide area network (for example, the Internet) and/or virtual networks (for example a virtual private network (VPN)).

RAM 113 and disk drive 114 are examples of tangible media (e.g., computer readable media) for storage of data, audio/video files, computer programs, applet interpreters or compilers, and virtual machines. For example, RAM 113 and/or disk drive 114 may store a computer program that when executed causes computer 110 to perform an embodiment of the method of the present invention. Other types of tangible media include floppy disks, removable hard disks, optical storage media (such as digital versatile disks read-only memory (DVD-ROMs), CD-ROMs, and barcodes), non-volatile memory devices (such as flash memories, ROMs, and battery-backed volatile memories), and networked storage devices. These tangible media may store a computer program that when executed causes a computer to perform an embodiment of the method of the present invention. The computer readable medium can also be distributed over a network-coupled computer system so that the computer readable code is stored and executed in a distributed fashion. It is to be noted that any or all steps of the embodiments of the methods of the present invention can be computer implemented. It is also to be noted that the above examples of computer readable media are examples of non-transitory computer readable media.

Image capturing device 120 includes memory 121, interface 122, processor 123, RGB camera 124, depth image camera 125, and bus 126. As can be seen in FIG. 1, bus 126 interconnects elements of image capturing device 120. In one embodiment, image capturing device 120 provides skeletal tracking information. In one embodiment, image capturing device 120 is a Kinect® device available from Microsoft® Corporation of Seattle, Wash.

In one embodiment, depth image camera 125 is an infrared (IR) camera. Also, in one embodiment, interface 122 is a USB interface. In one embodiment, interface 122 is a network interface. Interface 122 may be a wired or wireless interface device. In one embodiment, memory 121 may be RAM, ROM, or any other type of memory device suitable in the above context. In one embodiment, memory 121 may store computer executable code that when executed causes processor 123 to perform at least part of an embodiment of the method of the present invention. For example, memory 121 may store a computer executable code for causing processor 123 to provide skeletal tracking information. In one embodiment, one or more of memory 121, RAM 113, and disk drive 114, alone or in combination with the other memory elements, store(s) a computer executable code that when executed causes computer 110 (either alone or in combination with processor 123) to perform an embodiment of the method of the present invention.

It is to be noted that computer 110 and image capturing device 120 are only exemplary and a large variety of computer or image capturing device configurations may be suitable for implementing embodiments of the methods of the present invention. For example, in one embodiment, image capturing device 120 may essentially consist of an RGB camera, a depth image camera, and a suitable device for communicating with computer 110. Also, in one embodiment, the RGB camera and depth image camera may be part of the computer, in which case, there would not be an image capturing device separate from the computer. Also, as the term computer is herein used broadly to encompass any processor or any device with a processor, image capturing device 120 may be considered a computer.

Furthermore, it is to be noted that computer 110 and image capturing device 120 illustrated in FIG. 1 are simplified versions of a computer and an image capturing device, respectively. Accordingly, some details of both computer 110 and image capturing device 120 that are known in the art have been left out of FIG. 1 so as not to unduly overcomplicate the drawing. For example, in image capturing device 120, when depth image camera 125 is an IR camera, image capturing device 120 would include an IR gun (not shown) for emitting IR signals for capturing IR depth images.

Figure 2:
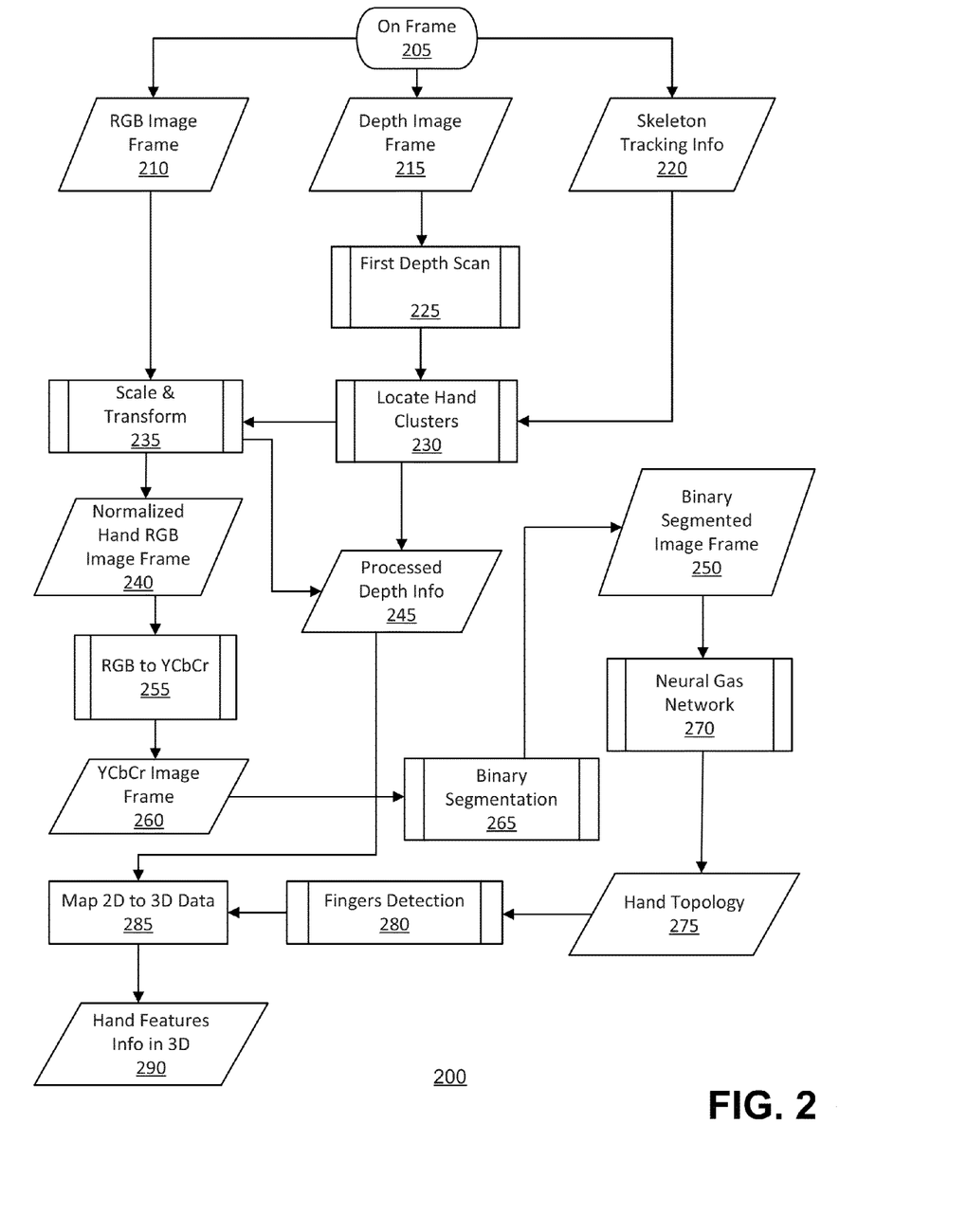
FIG. 2 is flowchart of an embodiment of a method of determining hand feature locations of the present invention.

FIG. 2 is flowchart of an embodiment of a method of determining hand feature locations of the present invention. Method 200 starts at 205 with frame on where images of an object are captured. The system will receive at least two streams of image frames, namely RGB image frame 210 and depth image frame 215. The RGB image frame is a 2D image frame of the object, whereas the depth image frame is a 3D image frame of the object. As used herein the term object is used broadly to include more than one object. As such, for example, the object may include one or more people, a table, and/or chair. Moreover, the captured image may include an image of a person, including an image of the different body parts of the person. In one embodiment, the RGB image frame is captured by a 2D camera, whereas the 3D image frame is captured by a depth image camera. In one embodiment, the depth image camera is an IR camera.

Figure 6:
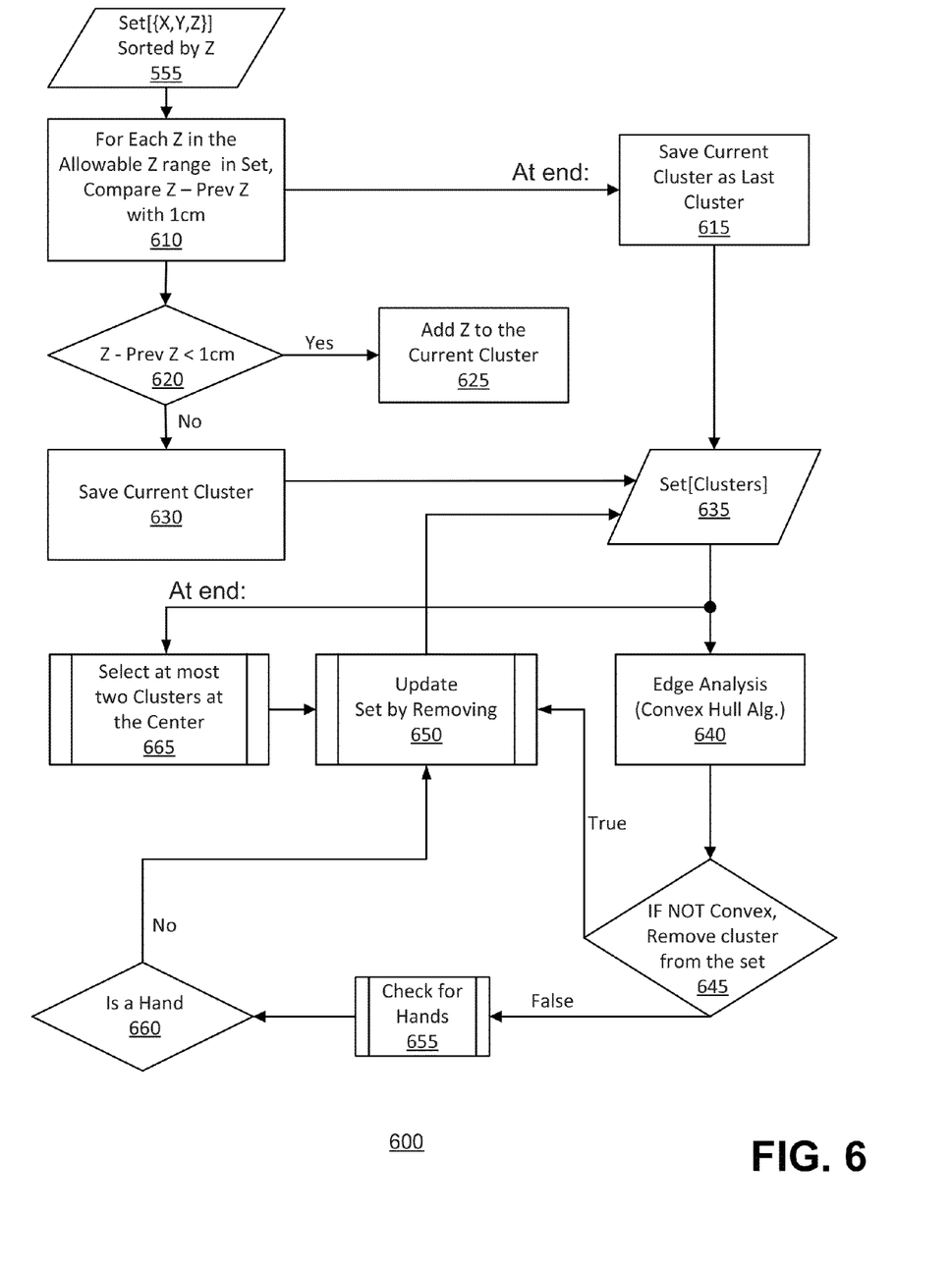
FIG. 6 is a detailed flowchart of an embodiment of a method of grouping z points shown in FIG. 5.

The depth image frame 215 is used in the first depth scan process 225. The first depth scan process 225, details of which are shown in FIG. 6, generally involves ordering the sets of depth image frames and providing a set of clusters, such as set of clusters 635 (shown in FIG. 6). Thereafter, data from the first depth scan process (i.e., the set of clusters 635) is used to perform the locate hand clusters process 230. The locate hand clusters process 230, details of which are shown in FIG. 6, generally involves selecting two hand clusters from the set of clusters 635.

In one embodiment, in addition to the RGB image frame 210 and depth image frame 215, the system also provides skeletal tracking information 220. Availability of the skeletal tracking information 220 is based on whether the system can recognize the presence of a body and the relevant parts of the body. When skeletal tracking information 220 is available, it will be used to reduce the amount of processing needed to locate certain features of the body, e.g., hands. The skeletal tracking information 220, when available, is fed into the locate hand clusters process 230. In such a case, the first depth scan process 225 is not performed. As the first depth scan process 225 is generally slower than the process of tracking skeletal information, using the skeletal tracking information option allows for speeding up the process.

In one embodiment, prior to using a depth image frame corresponding to an RGB image frame, it is first determined whether the RGB image frame has corresponding skeletal tracking information. In one such embodiment, event handlers are used to determine whether an RGB image frame has a corresponding skeletal tracking information or depth image frame. In one such embodiment, an RGB image frame is detected first, i.e., prior to any potential corresponding skeletal tracking information or depth image frame.

In one embodiment, detection of the RGB image frame triggers a timer for detecting corresponding skeletal tracking information. If, within a predetermined time of triggering the timer, corresponding skeletal tracking information is detected, then the RGB image frame and its corresponding skeletal tracking information are used in method 200. On the other hand, if, within a predetermined time of triggering the timer, corresponding skeletal tracking information is not detected, then the system concludes that skeletal tracking information corresponding to the RGB image frame is not available. In such a case, it is determined whether a depth image frame corresponding to the RGB image frame is available. If, within a predetermined time of triggering the timer, a corresponding depth image frame is detected, then the RGB image frame and its corresponding depth image frame are used in method 200. On the other hand, if, within a predetermined time of triggering the timer, a corresponding depth image frame is not detected, then the system concludes that a depth image frame corresponding to the RGB image frame is not available. In such a case, the RGB image frame is disregarded. In one embodiment, in all of the above cases, the predetermined time can be any period of time greater than or equal to 100 milliseconds and less than or equal to 200 milliseconds.

In one embodiment, the predetermined time for determining whether corresponding skeletal tracking information is available may be different from the predetermined time for determining whether a corresponding depth image frame is available. For example, the predetermined time for determining whether corresponding skeletal tracking information is available may be 200 milliseconds, whereas the predetermined time for determining whether a corresponding depth image frame is available may be 100 milliseconds.

The locate hand clusters process 230 provides the hand clusters set coordinates in 3D (i.e., x, y, and z coordinates) as part of the processed depth information 245. The hand clusters set coordinates provided by the locate hand clusters process 230 is the original 3D coordinates of the hand clusters. The locate hand clusters process 230 also provides the hand clusters set coordinates in 3D to the scale and transform process 235. The scale and transform process 235 scales and transforms the original 3D coordinates of the hand clusters set and provides scaled and transformed 3D coordinates of the hand clusters set. The scale and transform process 235 provides the scaled and transformed 3D coordinates of the hand clusters set as part of the processed depth information 245. Accordingly, the processed depth information 245 includes both the original and the scaled and transformed versions of the 3D coordinates of the hand clusters set.

In addition to the hand clusters set coordinates in 3D received from the locate hand clusters process 230, the scale and transform process 235 also receives the RGB image frame 210. Using the data from the locate hand clusters process 230, the scale and transform process 235 scales and transforms the RGB image frame 210. As a result of the scale and transform process 235, the RGB image frame 210 is transformed into a normalized hand RGB image frame 240. Further details regarding the transformation and scaling are, for example, provided in FIG. 7 and its corresponding description.

Figure 4A:
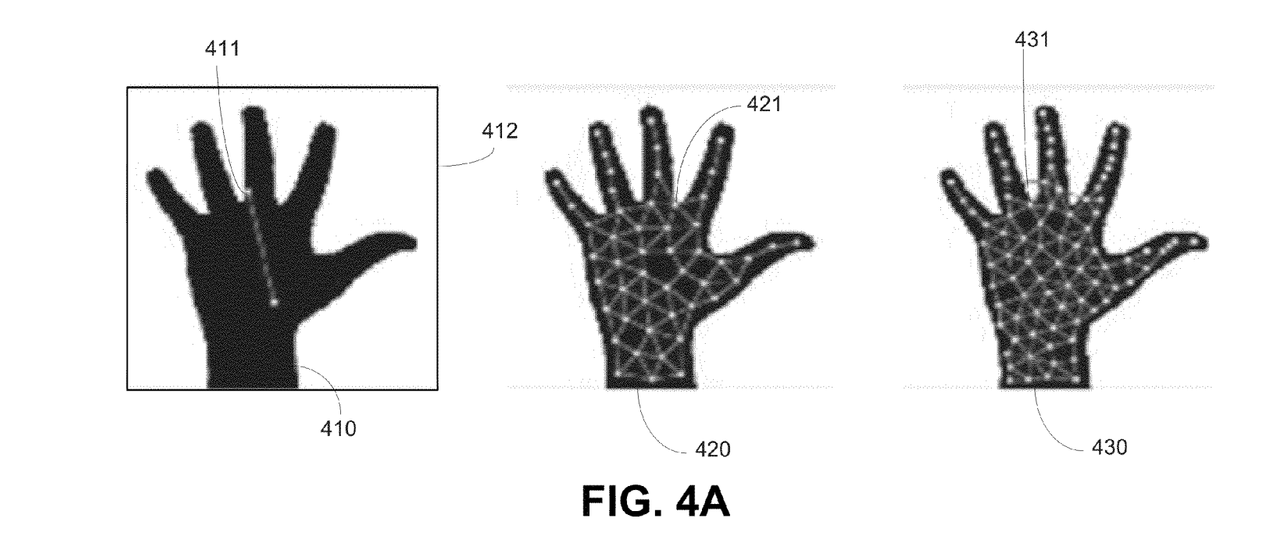
FIG. 4A illustrates various stages in applying a neural gas network process to a binary segmented image frame of an example of a hand posture.
Figure 4B:
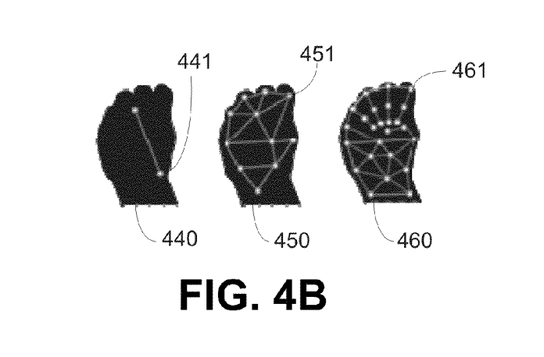
FIG. 4B illustrates various stages in applying a neural gas network process to a binary segmented image frame of another example of a hand posture.

In one embodiment, the scale and transform process 235 transforms, if necessary, each hand cluster set coordinates in 3D such that the plane defining the palm of the hand (also herein referred to as the palm plane) for that hand cluster is (1) parallel to the plane defining the surface of the lens of the RGB camera with which the 2D image frame is captured (which is herein referred to as the lens plane), with the palm facing the lens plane and (2) perpendicular to the plane defining the floor of the location where the image capturing device captured an image of the hand (which is herein referred to as the floor plane). The lens plane and the floor plane are those used at the time the 2D image frame is captured, which is substantially the same as the time that the 3D image frame is captured. Furthermore, each hand cluster set coordinates in 3D is also transformed such that the image of the palm of the hand is directed vertically upwards (i.e., in the positive x direction in the coordinate system discussed below). As a result, for each hand cluster, the transformed 3D image of the hand has a palm plane (1) parallel to the lens plane and (2) perpendicular to the floor plane, with the palm facing the lens plane and the palm directed vertically upwards. Similarly, the scale and transform process 235 transforms, if necessary, the RGB image frame 210 such that the plane defining the palm of the hand will be (1) parallel to the lens plane and (2) perpendicular to the floor plane, with the palm facing the lens plane and the palm directed vertically upwards. For example, the images shown in FIGS. 4A and 4B represent 2D images of a hand meeting the above conditions. As used in this context, perpendicular also encompasses substantially perpendicular. Also, as used in this context, parallel also encompasses substantially parallel. Furthermore, as used in this context, vertically upwards also encompasses substantially vertically upwards.

Furthermore, the scale and transform process 235 scales, if necessary, the image of the hand in the RGB image frame 210 such that the scaled 2D image of the hand fits within and corresponds to the size of a 2D frame of a predetermined size (which in one embodiment is rectangular). In one embodiment, the 2D image of the hand is scaled such that (1) the scaled 2D image of the hand fits within the rectangular 2D frame of predetermined size, (2) the width of the scaled 2D image of the hand fits within and is substantially equal to the width of the 2D frame of predetermined size, and (3) the height of the scaled 2D image of the hand fits within and is substantially equal to the height of the 2D frame of predetermined size. For example, in FIG. 4A, the 2D image 410 of a hand fits, as described above, in the rectangular 2D frame 412. Similarly, the scale and transform process 235 scales, if necessary, the image of the hand in the 3D image frame such that the scaled 3D image of the hand fits within and corresponds to the size of a 3D frame of a predetermined size (which in one embodiment is rectangular box). In other words, the 3D image of the hand is scaled such that (1) the scaled 3D image of the hand fits with the 3D frame of predetermined size, (2) the width of the scaled 3D image of the hand fits within and is substantially equal to the width of the 3D frame of predetermined size, (3) the height of the scaled 3D image of the hand fits within and is substantially equal to the height of the 3D frame of predetermined size, and (4) the depth (or length) of the scaled 3D image of the hand fits within and is substantially equal to the depth (or length) of the 3D frame of predetermined size.

In one embodiment, the normalized hand RGB image frame 240 is a rectangular image frame of a predetermined size that is suitable for providing to a neural gas network 270. As explained below, the normalized hand RGB image frame 240 is processed into a binary segmented image frame 250, which is provided to the neural gas network 270. In one embodiment, the size of the normalized hand RGB image frame 240 is the same as that of the binary segmented image frame 250.

The normalized hand RGB image frame 240 is used in the RGB to YCbCr process 255 to convert the normalized hand RGB image frame 240 to a YCbCr image frame 260, where Y represents luminance, and Cb and Cr are the chrominance components representing blue and red differences, respectively. Thus, the RGB image frame is converted into luminance and chrominance information.

In one embodiment, the RGB camera is prepared for ranges of skin colors. In one embodiment, this preparation is performed only once for each type of camera (rather than for each individual camera). In one embodiment, as part of the preparation, RGB images (50 or more) of hands with different skin colors are captured under various lighting conditions. Each of the RGB images is then converted into YCbCr color space and the average ranges for Cb and Cr (i.e., RCb and RCr, respectively) are calculated. As explained below, these calculated ranges are later used to perform image segmentation.

The YCbCr image frame 260 is provided to the binary segmentation process 265. For each YCbCr image frame 260 the binary segmentation process 265 produces a binary segmented image frame 250.

In one embodiment, the binary segmentation process 265 operates as follows. For each pixel, only the Cb and Cr components are selected. The chrominance components of the (i,j)th pixel are represented as $Cb(i,j)$ and $Cr(i,j)$, where i and j represent integers equal to or greater than 0. If $Cb(i,j)$ is within the range of RCb and $Cr(i,j)$ is within the range of RCr, then the pixel color is designated (or assigned) as black. Otherwise, it is designated as white. After each of the pixels is so designated, the size of "black" clusters are checked. In one embodiment, smaller clusters (such as those below 75% of the maximum sized cluster) are whited out. At the end of this process, the picture will contain segments that represent hands, which will be displayed in black, while the rest of the picture will be in white. Such a picture is represented as binary segmented image frame 250.

Figure 3:
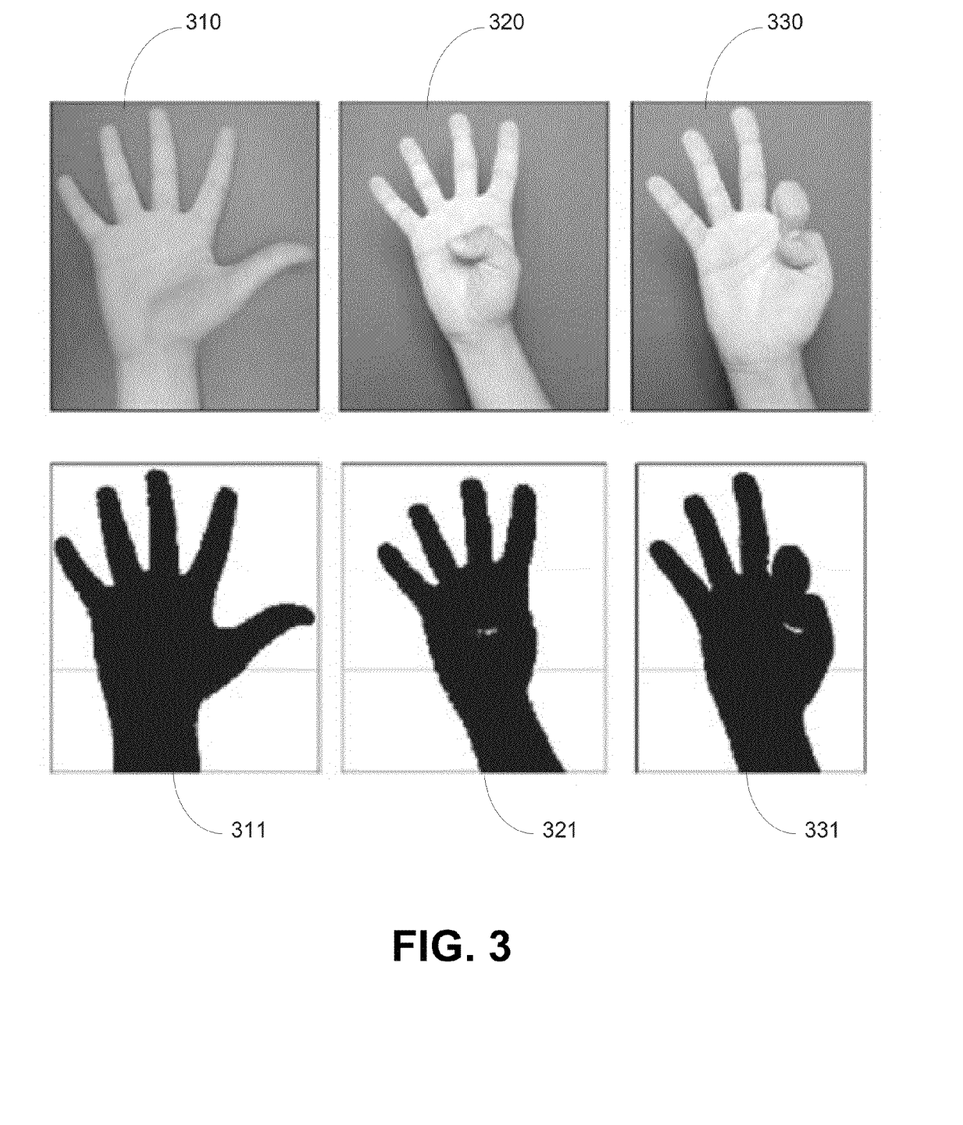
FIG. 3 shows a set of examples of different hand poses and their corresponding binary segmented image frames.

FIG. 3 shows a set of examples of different hand poses and their corresponding binary segmented image frames. More specifically, FIG. 3 shows images 310, 320, and 330 (which are in greyscale rather than color due to USPTO restrictions regarding color drawings) and their corresponding binary segmented image frames 311, 321, and 331, respectively, that are produced by the binary segmentation process 265.

The binary segmented image frame 250 is provided to the neural gas network 270. The neural gas network 270 processes the binary segmented image frame 250 to produce the hand topology data 275 (which may also herein be referred to as hand mesh 275). More specifically, the neural gas network 270 processes the black pixels of the binary segmented image frame 250 and produces a grid of neuron points that represent the hand in the binary segmented image frame 250. Accordingly, the hand topology data 275 represents the neural network representing the hand that is output by the neural gas network 270. It is to be noted that, in one embodiment, the hand topology data 275 represents a 2D neural network representing the hand.

In one embodiment, the neural gas network utilized is the Self-Growing and Organized Neural Gas (SGONG). In another embodiment, a neural gas network other than SGONG (including one that is a variant of SGONG) may be utilized. SGONG combines the advantages of Kohonen Self Organizing Feature Map (SOFM) and Fritzke's Growing Neural Gas (GNG) model. SGNOG is an unsupervised neural network that is comprised of an input layer and an output layer. In SGNOG, the presented input grid is classified into a grid of neurons where each neuron eventually addresses a feature.

SGONG has a number of features or characteristics, some of which are listed or explained below. First, the number of output neurons is not fixed. Second, the neural network acts as a feature extractor. In this particular case, this concept is used to extract hand topology. Third, the neural network in not supervised, i.e., no a priori information is fed back to the network. Fourth, each neuron acts to represent a feature in a feature set, with the initial assumption to have only two features that represent the topology. Fifth, the learning process causes the number of output neurons to grow by adding a new neuron into system, when the existing neurons cannot represent a particular feature. Sixth, when more than one neuron is capable of representing a particular feature, those neurons compete for the final representation. The losing neuron is removed from the system causing the number of output neurons to shrink. This tends to happen towards the end of the learning process and can be treated as a signal that the system is nearing its optimized state. Seventh, the neurons are assigned to features by applying a competitive Hebbian rule to a particular neuron with respect to its neighboring neurons. The winning neuron is assigned to represent the feature in question. Eighth, another way to visualize the process is triangulation of the segment topology by applying DeLaunay Triangulation. The neurons then are points that correspond to the center of gravity of each triangle.

As noted above, the training procedure starts with two neurons with weights randomly assigned to those neurons. The weights of these two neurons are updated against the input and errors against vector quantization are calculated against the neuron being there as well as the case of the neuron not being there (i.e., the neuron being removed). The values obtained are used to calculate distances between neighboring neurons. If a particular distance is larger than an allowed distance, the system creates another neuron and places it (as a third neuron) in between the original two neighboring neurons. Therefore, the grid starts with two neurons and then neurons increase in numbers to fill in the shape presented in the input. This procedure is repeated until there is no need to create additional neurons in the output grid. To avoid having the procedure continue indefinitely, it is also allowed to take a maximum cut-off neuron number. As a result, the procedure is forced to finish even if the system has not reached stability.

FIG. 4A illustrates various stages in applying a neural gas network process to a binary segmented image frame of an example of a hand posture. In FIG. 4A, where the hand is in an open position with the fingers completely open and extended, the result of the beginning of the process is illustrated with image 410 which has two neurons, the middle of the process is illustrated with image 420 (where the number of neurons has grown to 48), and the final output of the process is illustrated with image 430 (where the neuron grid contains 83 neurons). In FIG. 4A, the neurons are shown as white dots, with one of the neurons in image 410 referenced as 411, one of the neurons in image 420 referenced as 421, and one of the neurons in image 430 referenced as 431. In FIG. 4A, the locations of neurons 431 in image 430 may represent an example of the hand topology data 275 that is output by neural gas network 270.

FIG. 4B illustrates various stages in applying a neural gas network process to a binary segmented image frame of another example of a hand posture. In FIG. 4B, where the hand is in a closed first position, the result of the beginning of the process is illustrated with image 440 which has two neurons 441, the middle of the process is illustrated with image 450 (where the number of neurons has grown to 11), and the final output of the process is illustrated with image 460 (where the neuron grid contains 25 neurons). In FIG. 4B, the neurons are shown as white dots, with one of the neurons in image 440 referenced as 441, one of the neurons in image 450 referenced as 451, and one of the neurons in image 460 referenced as 461. In FIG. 4B, the locations of neurons 461 in image 460 may represent an example of the hand topology data 275 that is output by neural gas network 270.

In one embodiment, the coordinates of the output neurons are centers of the classes they represent, and each neuron's position can be mapped to the original coordinate of the image in 2D or 3D. In one embodiment, the neurons that have only one connection with a neighboring neuron can be tagged as potential fingertips. By following connections of potential fingertips, the rest of the finger neurons, the base of each finger, the palm of the hand and the base of the hand can be located. Since the procedure deals with the neurons as elements of a coordinate system, differences between fully extended finger and closed finger can be detected. In other words, for example, it can be determined that a closed finger's potential fingertip is not a fingertip, but the knuckle of that finger.

Figure 8:
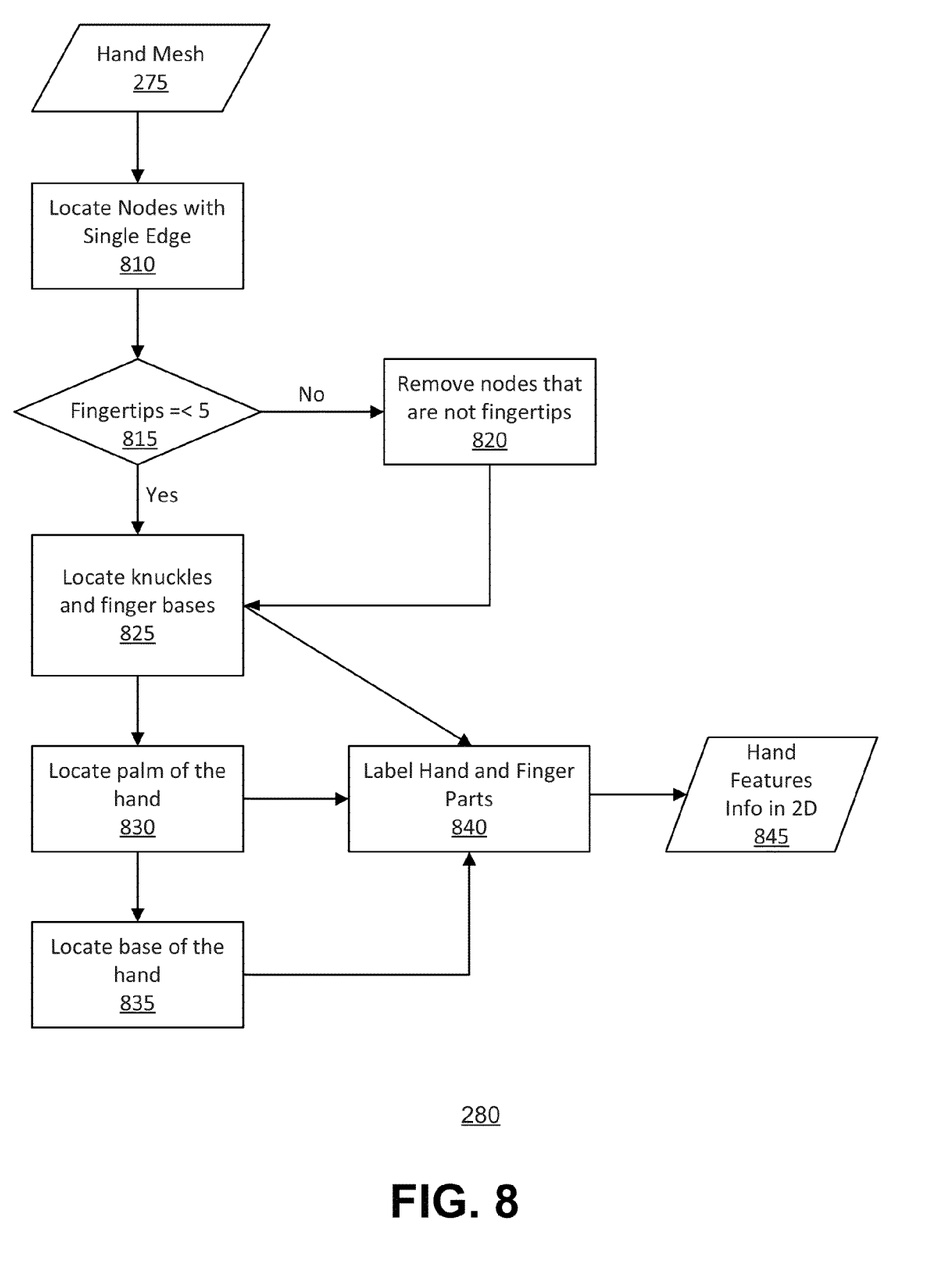
FIG. 8 is a detailed flowchart of an embodiment of a method of the finger detection process shown in FIG. 2.

Referring back to FIG. 2, the hand topology data 275 is provided to the finger detection process 280 (details of which are shown in FIG. 8). The finger detection process 280 determines the hand features information in 2D 845 (shown in FIG. 8) and provides the hand features information in 2D 845 to the map 2D to 3D data process 285. As used herein, hand features information may include information regarding the location of the hand and hand components (e.g., fingers, palm, and base) as well as other information regarding the hand (e.g., left hand or right hand), and hand components (e.g., index finger, length and orientation of the finger, posture of the finger). In hand features information in 2D 845, the location information is in 2D coordinates. The map 2D to 3D data process 285 also receives the processed depth information 245. Using the processed depth information 245, the map 2D to 3D data process 285 maps the 2D hands data (e.g., fingers and palms location data) to 3D hands data (e.g., fingers and palms location data). In one embodiment, the 2D hands data, which may already be transformed and scaled relative to the original 2D data, is mapped to the 3D transformed data (i.e., the 3D data that may already be transformed and scaled relative to the 3D original data). As used herein, the 3D original data refers to the data in 3D (i.e., x, y, and z coordinates) captured by the depth image camera that has not been scaled or transformed. Thereafter, the 3D transformed data is mapped to the 3D original data. In another embodiment, the 2D hands data may be mapped to the 3D original data without the intervening step of being mapped to the 3D transformed data. The output of the map 2D to 3D data process 285 is the hand features information in 3D 290, where the location information is in 3D original data coordinates.

Figure 5:
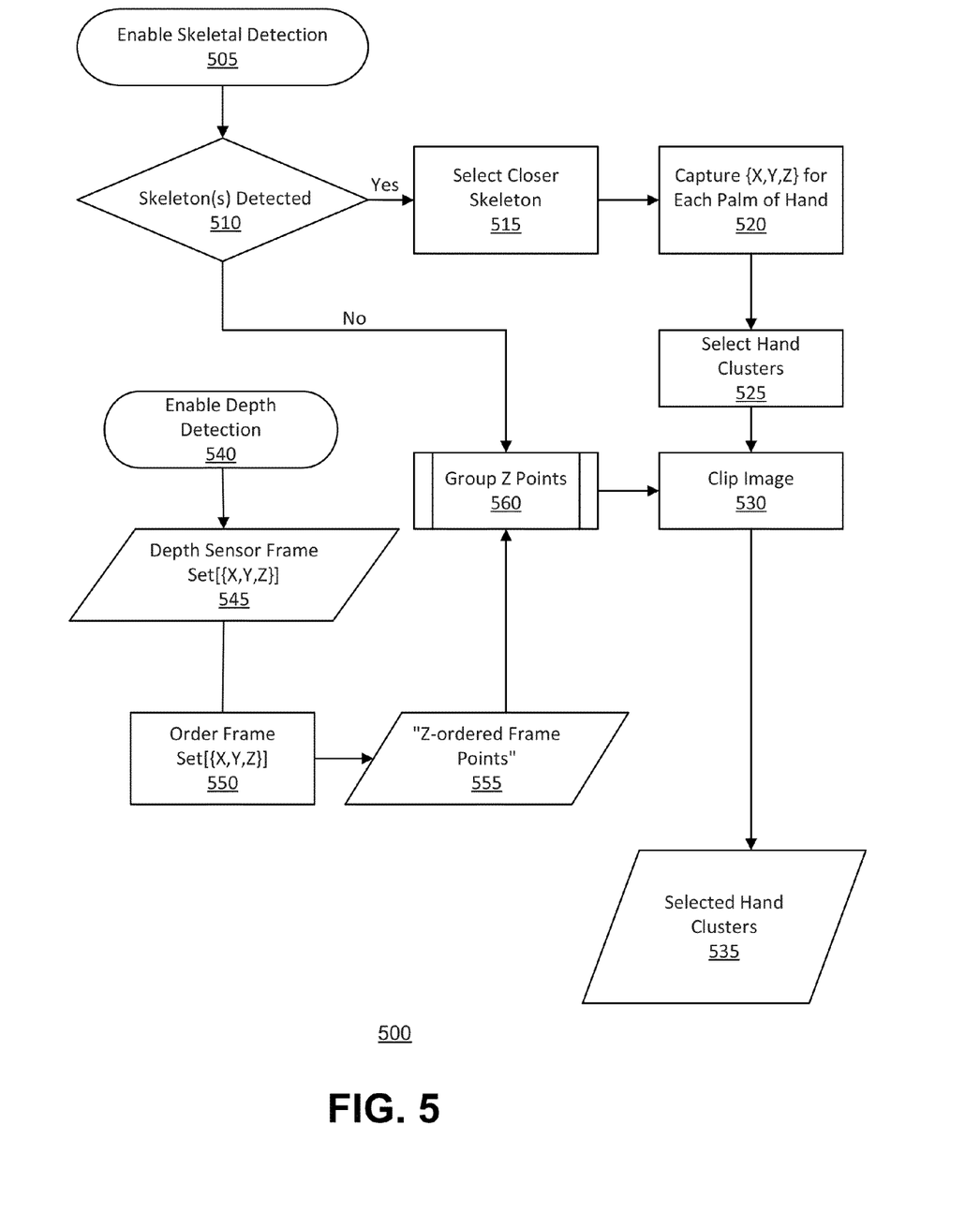
FIG. 5 is flowchart of an embodiment of a method of determining selected hand clusters.

FIG. 5 is flowchart of an embodiment of a method of determining selected hand clusters. The method 500 of determining selected hand clusters begins at enable skeletal detection 505, in case the system provides for skeletal detection. In one embodiment, skeletal readings are generated as part of the Microsoft® Kinect® software development kit (SDK) capabilities. At 510, it is determined whether skeleton(s) (i.e., one or more skeletons) are detected. If a body (upright or seated) is sensed in front of the image capturing device 120 (shown in FIG. 1) and the system provides skeletal detection, then the system will return skeletal information about each body detected in a structure comprised of body joints. In one embodiment of the present invention, the body joints of interest are those belonging to the palms of the hands.

If the answer at 510 is yes, then the method 500 proceeds to 515, where the system selects the skeleton closer to the image capturing device 120 (shown in FIG. 1). It is to be noted that when only one skeleton is detected, then that only skeleton is selected at 515. From 515, method 500 proceeds to 520, where for the closer skeleton, the system captures the x, y, and z coordinates for the palms of the hands of the closer skeleton. It is to be noted that where the system has the skeletal detection feature, the skeletal detection provides the coordinates of the palms of the detected skeleton(s). From 520, method 500 proceeds to 525, where the system selects clusters of data point representing hands. From 525, method 500 proceeds to 530 where the image representing the hand clusters is clipped such that each cluster representing a hand fits with an image frame of a predetermined size.

If the answer at 510 is no, then the method 500 proceeds to the group z points process 560. The answer at 510 may be no because (1) the system does not provide for skeletal detection or (2) the system provides for skeletal detection, but (a) there is no skeleton in the line of sight of the image capturing device 120 or (b) there is skeleton in the line of sight of the image capturing device 120, but the system (i) fails to detect the skeleton or (ii) fails to indicate that a skeleton has been detected.

At 540, depth detection is enabled. With depth detection enabled, for each captured frame, the system provides a depth sensor frame set 545 which includes the x, y, and z coordinates of the data points of the captured frame.

In one embodiment, the x and y coordinates, represent vertical and horizontal coordinates, respectively. Also, in one embodiment, x coordinates below the horizontal plane defining the image capturing device horizon (more specifically the horizontal plane defining the vertical midpoint of depth image camera 125) have negative values, whereas x coordinates above the horizontal plane defining the image capturing device horizon have positive values. Also, in one embodiment, y coordinates to the right (from the perspective of the image capturing device) of the vertical plane defining the image capturing device (i.e., the vertical plane that is perpendicular to the horizontal plane defining the image capturing device horizon and that defines the horizontal midpoint of the depth image camera 125) have positive values, whereas y coordinates to the left of the vertical plane defining the image capturing device have negative values. It is to be noted that the above-mentioned horizontal plane is parallel to the previously-mentioned floor plane and perpendicular to the previously-mentioned plane of the lens plane. Similarly, it is to be noted that the above-mentioned vertical plane is perpendicular to the previously-mentioned floor plane and parallel to the previously-mentioned lens plane.

In one embodiment, height is represented as distances between maximum and minimum x values, whereas width is represented as distances between maximum and minimum y values. Also, in one embodiment, the z coordinate value, which represents distance from the image capture device along the line resulting from the intersection of the horizontal plane defining the image capturing device and the vertical plane defining the image capturing device, is always positive. In such an embodiment, the point along the above-mentioned intersecting line where the depth image camera 125 lens is located has a z coordinate value of 0 and points along the line in front of the depth image camera 125 have positive values. In one embodiment, the x, y, and z coordinates are scanned separately, but in parallel.

The depth sensor frame set 545 is provided to the order frame set process 550. The order frame set process 550 orders the depth sensor frame set 545 as z-ordered frame points 555 (which may also herein be referred to as a set of data points sorted by z 555), where the data points are ordered in increasing order of their z coordinates. In other words, the data points are ordered in order of increasing depth relative to the depth image camera 125. In one embodiment, for each z coordinate with data points, the z coordinate reading is mapped to all points encountered in the other two (x and y) coordinates. Accordingly, the z-ordered frame points 555 contains an ordered set where, for each z reading, data points are represented as a z reading that maps to a collection of x and y readings for that z.

Also, in one embodiment, in addition to ordering the depth sensor frame set 545, the order frame set process also scans minimum and maximum values for x, y, and z readings and provides the minimum and maximum values for x, y, and z readings. In one embodiment, the scanning of the minimum and maximum values is done in parallel for the x, y, and z coordinates. In one embodiment, the scans performed on the x and y coordinates are simple scans to determine bounding geometry in terms of height and width, respectively. In one embodiment, the scans performed on the x and y coordinates also provide statistical calculations that provide information about distribution around these two coordinates within the workable depth-range (which may also be referred to as the workable z range). The workable z range refers to the z range within which data points may be of interest and are accordingly processed and outside of which the data points are not of interest and are accordingly discarded.

The z-ordered fame points 555 is provided to the group z points process 560, which is shown in detail in FIG. 6 and described in further detail below. From the group z points process 560, method 500 proceeds to the clip image process 530. It is to be noted that, if a skeleton is not detected at 510, then the clip image process 530 follows the group z points process 560. On the other hand, if skeleton(s) are detected at 510, then the clip image process 530 follows the select hand clusters process 525. The clip image process 530 (1) clips the clusters it is provided (e.g., the final set of clusters 635 (shown in FIG. 6)) such that the clipped clusters contain only hand clusters and (2) outputs the selected hand clusters 535 (which may also be referred to as the clipped hand clusters 535). The selected hand clusters 535 are a set of coordinates that represent most likely clusters depicting hands.

FIG. 6 is a detailed flowchart of an embodiment of a method 600 of grouping z points shown in FIG. 5. Generally speaking, in method 600, sorted set of mappings for z coordinate readings will be used to determine clusters that represent hands detected by the image capturing device. In one embodiment, clustering is performed on depth (i.e., the z coordinate) and follows similar steps related to the k-means non-hierarchical clustering algorithm. The points encountered in the frame readings are clustered in distinct ranges of depth. In one embodiment, these cluster ranges are not fixed in size, but are calculated based on performing a continuity analysis of the points over their z value (depth). In other words, the algorithm continues to include points within a cluster in increasing depth values as long as there is no discontinuity of more than a predetermined distance (e.g., 1 cm) between two consecutive z values. The predetermined distance depends on the sensitivity of the image capture device 120 used.

In method 600, the set of data points sorted by z coordinate 555 are received. At 610, for each z in the allowable z range for the set of data points sorted by z coordinates 555, it is determined how z-z previous compares with a predetermined distance (e.g., 1 cm). At 620, it is determined whether z-z previous is less than the predetermined distance (e.g., 1 cm). If the answer at 620 is yes, then method 600 proceeds to 625, where data points at the z coordinate are added to the current cluster. If at 620 the answer is no, then method 600 proceeds to 630, where the current cluster is saved. The saved current cluster is added to the set of clusters 635. Thereafter, the method resumes at 610 until all data points in the allowable z range (i.e., the workable z range) for the set 555 have been tested for discontinuity and clustering. At the end of performing the comparisons at 610 for each z in the allowable z range, the last set of data in the current cluster 625 is at 615 saved as the last current cluster and added to the set of clusters 635. Thereafter method 600 continues at 640.

In one embodiment, the workable z range is 1 to 3 meters (m). In one embodiment, the workable z range is configurable by the user within the workable z range for the image capturing device used. In one such embodiment, if the workable z range is not configured by the user, the default workable z range for the image capturing device is used. For example, if the image capturing device is a Kinect® device, the default workable z range would be 80 centimeters (cm) to 4 m. In one embodiment, data points that fall outside of the workable z range will be discarded. In one embodiment, as part of the group z points process 560 (shown in FIG. 5), found data points or clusters will be evaluated against the workable z range and data points or clusters that fall outside the workable z range will be discarded.

At 640, edge analysis (e.g., Convex Hull Algorithm) is performed on the clusters in the set of clusters 635. The edge analysis analyzes the data in the clusters to determine whether the cluster represents a convex feature. At 645, a decision is made on whether the cluster is convex. If, based on the decision at 645, it is determined that the cluster is NOT convex, then method 600 proceeds to the update set by removing process 650. In other words, if the cluster is NOT convex, then it is removed from the set of clusters. If, based on the decision at 645, it is determined that the cluster is convex, then method 600 proceeds to the check for hands process 655. The check for hands process 655 determines whether the cluster represents a hand. At 660, a decision is made whether the cluster represents a hand. If, based on the decision at 660, it is determined that the cluster does not represent a hand, then the process proceeds to the update the set by removing process 650. If, based on the decision at 660, it is determined that the cluster does represent a hand, then the process returns to 640 to test the next cluster from the set of clusters 635.

At the end of testing all clusters in the set of clusters 635 for convexity and all convex clusters for being hands, the process proceeds to 665. In other words, once all the clusters in the set of clusters 635 have been processed at 640 and all the applicable portions of method 600 that follow 640, the clusters remaining in the set of clusters 635 are provided to the select at most two clusters at the center process 665. The select at most two clusters at the center process 665 selects at most two clusters at the center of the frame from the set of clusters 635. In one embodiment, center process 665 selects the two clusters that are closer to the center (closest to zero for x and y values of each cluster's center of gravity). From 665, the method 600 proceeds to the update the set by removing process 650. The result of the update the set by removing process 650 is fed back to the set of clusters 635, such that the set of clusters 635 reflects the updating performed by the update the set by removing process 650. The final set of clusters 635, after updating, would contain at most two clusters representing hands at the center of the frame.

In one embodiment, if there are only two or less clusters in the set of clusters 635, then neither edge analysis 640 nor select at most two clusters at the center 665 is performed. In an alternative embodiment, if there are only two or less clusters in the set of clusters 635, then the select at most two clusters at the center 665 is not performed. However, edge analysis 640 and the remaining applicable portions of method 600 are performed to eliminate any cluster that does not represent a hand or a convex object.

Figure 7:
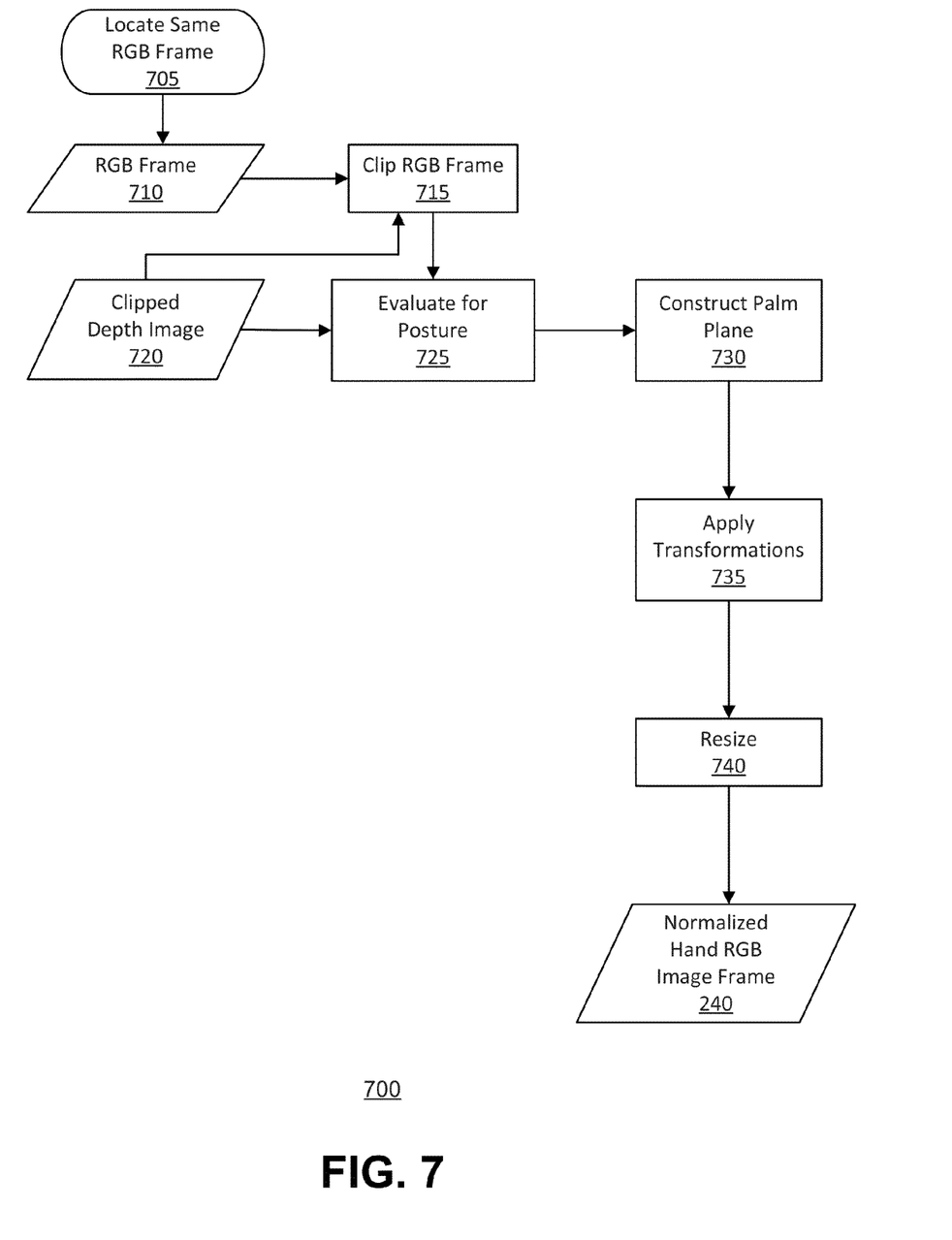
FIG. 7 is a detailed flowchart of an embodiment of a method of determining the normalized hand RGB image frame shown in FIG. 2.

FIG. 7 is a detailed flowchart of an embodiment of a method of determining the normalized hand RGB image frame shown in FIG. 2. The method 700 of determining the normalized hand RGB image begins at 705, where the RGB frame corresponding to the depth image frame is located. In one embodiment, the RGB frames and depth image frames are time stamped. In such an embodiment, locating the RGB frame that corresponds to the depth image frame involves finding the RGB frame that is within an acceptable time frame of the corresponding depth image frame. The output of 705 is the RGB image frame 710. The clip the RGB frame process 715 receives the RGB image frame 710 and its corresponding clipped depth image frame 720. In one embodiment, the clipped depth image frame 720 is the selected hand clusters 535 (shown in FIG. 5), which is a depth image frame output by the clip image process 530 (shown in FIG. 5). The clip the RGB frame process 715 clips the RGB image frame 710 based on the information (the x and y coordinates) in the clipped depth image frame 720 such that the clipped RGB frame corresponds to the clipped depth image frame 720. In other words, the RGB image frame 710 is clipped such that it also fits within a predetermined frame. More specifically, the RGB image frame 710 is clipped such that the clipped RGB image frame contains primarily an image of a hand. In one embodiment, this is done separately for each hand in the RGB image frame 710. As a result, there may be more than one clipped RGB image frame that is output by the clip RGB image frame process 715 and is processed by other parts of method 700.

From the clip the RGB frame process 715, the method 700 proceeds to the evaluate for posture process 725. The evaluate for posture process 725 also receives the clipped depth image frame 720. In one embodiment, the evaluate for posture process 725 computes the aspect ratio (i.e., width divided by height) of the selected cluster against pre-defined range of expectations to estimate what posture the hand might have (e.g., whether it is facing flat towards the camera, somewhat orthogonal to camera, curled flat, curled orthogonal, or slanted). In the above-described coordinate system, the width would be along the y coordinate, whereas the height would be in the x coordinate. In one embodiment, the evaluate for posture process 725 is not computationally heavy, since it is expected to generate only hints. In one embodiment, computation of aspect ratios is done for each of the x, y, and z planes of a 3D coordinate system. The x plane refers to a plane defined by the y and z axes or a plane parallel to a plane defined by the y and z axes. The y plane refers to a plane defined by the x and z axes or a plane parallel to a plane defined by the x and z axes. The z plane refers to a plane defined by the x and y axes or a plane parallel to a plane defined by the x and y axes. The x, y, and z axes refer to the x, y, and z axes in the above-mentioned 3D coordinate system. In one embodiment, the rough estimate from the evaluate for posture process 725 is used to determine the palm plane, i.e., the plane defined by the palm of the hand.

From the evaluate for posture process 725, the method 700 proceeds to the construct the palm plane process 730. In one embodiment, using z readings data collected earlier (i.e., the depth readings) and the hint generated in the evaluate for posture process 725, a plane is constructed by using the ordered set of z coordinate values encountered. The hint generated in the evaluate for posture process 725 is used to select the algorithm to apply to construct the plane. The difference among the algorithms is in how they start to place the center of mass within the cluster. For example, an open hand facing towards the camera (i.e., parallel to the lens plane and perpendicular to the floor plane) will put less emphasis on the z coordinate in calculating the center of mass. On the other hand, a hand posture that is orthogonal to the lens plane will use the z coordinate with the most emphasis in calculating the center of mass. The algorithm will then use the coordinate (or coordinates) with less emphasis for posture hint to perform ray analysis by extending from the calculated center of mass to the edges of the cluster. Circular representation of calculated rays will help determine the palm plane.

It is to be noted that in one embodiment, the afore-mentioned generated hint is used to reduce the complexity of the calculations necessary for processing data. Since it takes more time to calculate the center of mass for a true 3D shape than for a simplified 3D shape with negligible "thickness," the hint allows for more quickly determining which dimension of 3D shape can safely be assumed to have negligible "thickness." With the benefit of the hint, the center of mass can be calculated more quickly. The center of mass represents the simplified location point for the structure of interest, e.g., the detected palm of the hand.

In one embodiment, each captured 3D cluster that represents a hand is reduced into its respective surface representation. In one embodiment, this can be done by detecting the edges of the 3D cluster. There are a number of well-known algorithms for detecting edges, such as Contour Tracking, Opaque Cubes, Marching Cubes, Dividing Cubes, Marching Tetrahedra. For example, the Marching Cubes algorithm starts to dissect the shape into unit cubes and analyzes the cubes that do not entirely contain the shape, since these cubes carry edge information for the shape. There are 8 vertices in a cube, therefore $2^8$ (i.e., 256) possible ways that these vertices may come into play at the surface. In some cases, these 256 possible ways can further be reduced to 15 due to the fact that some possibilities are symmetric with each other. As a result, the surface information can be indexed into 15 different encodings that provide the surface representation of the 3D shape. The hints are also useful in locating the x, y, and z planes from the surface data. The x, y, and z planes, in turn, supply a visual cue for applying the transformations needed for orientating the image of the hand as desired.

From the construct the palm plane process 730, the method 700 proceeds to the apply transformations process 735. In the apply transformations process 735, the palm plane will be rotated and/or tilted as required to achieve the desired orientation. In one embodiment, in the desired orientation, palm plane will be (1) parallel to the lens plane (which is described above) and (2) perpendicular to the floor plane (which is described above), with the palm facing the lens plane and directed vertically upwards.

In one embodiment, based on the orientation of the palm plane determined in the construct the palm plane process 730, the angles Ax, Ay and Az by which the palm plane is to be rotated or tilted about the x, y and z coordinates, respectively, in order for the palm plane to be in the above-described desired orientation will be determined. The angles Ax, Ay and Az are used, in the apply transformation process 735, to determine how the palm plane should be transformed (e.g., rotated or tilted) with respect to the x, y, and z coordinates, respectively, such that the transformed palm plane will be (1) parallel to the lens plane (which is described above) and (2) perpendicular to the floor plane (which is described above), with the palm facing the lens plane and directed vertically upwards. In one embodiment, the angle Ax determines the degree to which the palm plane will be rotated about the x coordinate in the x plane. The angle Ay determines the degree to which the palm plane will be rotated about the y coordinate in the y plane. The angle Az will determine the degree to which the palm plane will be rotated about the z coordinate in the z plane.

From the apply transformations process 735, the method 700 proceeds to the resize process 740 (which may also herein be referred to as the scaling process 740). The transformed image output by the apply transformations process 735 is compared against a predetermined size range. If the transformed image fits within the range, the transformed image is not resized. On the other hand, if the transformed image does not fit within the predetermined size range, a scaling factor is calculated against the mean of the predetermined size range and the transformed image is resized accordingly so as to fit within the predetermined size range. The output of the resize process 740 is the normalized hand RGB image frame 240, which is to be used to find topological features of the hand.

FIG. 8 is a detailed flowchart of an embodiment of a method of the finger detection process shown in FIG. 2. Method 280 of determining hand features information generally involves applying graph walking techniques to the topology of the hand output by the neural gas network process 270. Graph walking essentially involves going from node to node in the hand mesh 275 and is used to help locate and label features of the hand. Graph walking or walking the graph may also herein be referred to as analyzing the hand mesh 275. In addition to the hand mesh 275, method 280 also has access to data generated during processing depth image scanning (e.g., original and processed 3D data).

In method 280, the locate nodes with single edges routine 810 receives the hand mesh 275 (shown in FIG. 2) output by the neural gas network 270 (also shown in FIG. 2). The locate nodes with single edges routine 810 analyzes the hand mesh 275 and finds distinct nodes (in hand mesh 275) that have only one edge, where an edge refers to a connection between two nodes, as in the context of graph theory. As used herein, a distinct node refers to a node that shares the same edge with no more than one other node in the hand mesh 275.

For each distinct node, locate nodes with single edges routine 810 traces the edge of the distinct node to the next connected node. This next connected node is expected to have only one other edge in addition to the edge is shares with the distinct node. In the case of fully extended fingers, at least three distinct nodes connected in series should be encountered. The above process is repeated for the next node until encountering a node that has more than two edges. An ordered list of x and y coordinate readings for each node with a single edge is created. Strings of such nodes are marked as potential fingers.

Each node that is connected to only one other node represents a potential fingertip. At 815, it is determined whether there are five or fewer potential fingertips identified for a hand. If the answer at 815 is no, then the process continues at 820. At 820, nodes that are not fingertips are removed from the potential list of fingertips. In one embodiment, if more than five potential fingers are identified, the mean value for the y coordinate is determined for the more than five potential fingers. Thereafter, the five potential finger representations that are clustered together around this mean value with respect to the y coordinate reading will be selected. The remaining potential finger representations will be discarded. From 820, process 280 continues at 825.

If the answer at 815 is yes, i.e., there are five or fewer potential fingers, the process continues at 825. At 825, the hand mesh 275 (or node graph) is walked to find or locate knuckles and finger bases of the hand. At 830, the hand mesh 275 is walked to locate the palm of the hand. In one embodiment, the node that has the maximum number of edges is indicated as the palm of the hand. In case more than one such node is encountered, the one closest to the mean y coordinate (i.e., the mean value with respect to the y coordinate for the hand mesh 275) is picked and labeled as the palm. At 835, the hand mesh 275 is walked to locate the base of the hand. In FIG. 8, steps 825, 830, and 835 are shown as occurring in series. In another embodiment, steps 825, 830, and 835 are performed in parallel.

From steps 825, 830, and 835, the process continues at 840. At 840, the hand and finger parts are labeled. For example, a hand is labeled as a right hand or a left hand and a finger is labeled as an index finger. In one embodiment, for each finger, the length, the orientation, and the posture (whether it is straight, or curled or forming an arc) are calculated. From these calculations, labels are assigned to each finger indicating the type of finger (e.g., index finger).

The output of the label hand and finger part 840 is hand features information in 2D 845 (where the coordinates for the hand features are provided in 2D). In one embodiment, hand features information in 2D 845 is a data structure that labels each hand, each finger, and the palm of the hand. In one embodiment, each finger is represented by an ordered list of 3D coordinates where the first item in the list refers to the fingertip and the last item indicates the base.

Although the list items have reference to 3D coordinates, at the end of this stage only 2D coordinate readings will be populated. The data structure will also contain posture information for each finger which will mark if there is indeed a fingertip or not, or how much the finger is curled based on how many items the finger list contains. The pose information affects the way the first item in the list is interpreted. For example, if the pose is extended, then the first item is indeed a fingertip. As another example, if there is only one item in the list, then it is the base knuckle.

In one embodiment, the hand features information in 2D 845 is subjected to further processing, where the depth information is added from the original readings (before the resize was applied) and the x and y coordinates are converted to their original readings before the transformation to normalize tilting was applied. In other words, the 2D data is mapped to 3D as in step 285 (shown in FIG. 2).

As used herein, specific sizes or ranges are intended to include approximations of those sizes or ranges. For example, 100 milliseconds and 1 m are respectively intended to include approximately 100 milliseconds and approximately 1 m. Also, for example, 1 to 3 m is intended to include approximately 1 m to approximately 3 m.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method comprising:
receiving a two dimensional (2D) image frame;
receiving three dimensional (3D) image data corresponding to the 2D image frame;
using the 3D image data corresponding to the 2D image frame, rotating and scaling the 2D image frame,
wherein the rotating and scaling results in a normalized 2D image frame, wherein the normalized 2D image frame is a scaled and rotated version of the 2D image frame,
further wherein the scaling and rotating is performed using a computer;
determining hand features information in two dimensions of a hand in the normalized 2D image frame; and
mapping the hand features information in two dimensions to hand features information in three dimensions.

2. The method of claim 1, wherein the 3D image data corresponding to the 2D image frame is (a) skeletal tracking information corresponding to the 2D image frame or (b) a 3D image frame corresponding to the 2D image frame.

3. The method of claim 1 further comprising:
clipping the 3D image data;
producing a clipped 3D image data, wherein the clipped 3D image data contains a 3D image of the hand in a 3D image frame of a predetermined size;
using the clipped 3D image data, clipping the 2D image frame; and
producing a clipped 2D image frame, wherein the clipped 2D image frame is a 2D image frame of a predetermined size and contains a 2D image of the hand.

4. The method of claim 1, wherein the 2D image frame includes a 2D image of the hand, further wherein the 3D image frame includes a 3D image of the hand, the method further comprising:
determining an aspect ratio of the hand in the 3D image data; and using the aspect ratio, determining a palm plane for the hand.

5. The method of claim 4, wherein rotating the 2D image frame comprises rotating the palm plane such that it is (a) parallel to a lens of a camera with which the 2D image frame was captured and (b) perpendicular to a floor plane, wherein the floor plane is a plane defined by a floor of a location where the 2D image frame was captured, further wherein the scaling the 2D image frame comprises scaling the 2D image frame such that the 2D image of the hand fits within a frame of a predetermined size.

6. The method of claim 1, wherein, if skeletal tracking information corresponding to the 2D image frame is available, then:
using the skeletal tracking information corresponding to the 2D image frame, rotating and scaling the 2D image frame,
wherein, if skeletal tracking information corresponding to the 2D image frame is not available, but a 3D image frame corresponding to the 2D image frame is available, then:
using the 3D image frame corresponding to the 2D image frame, rotating and scaling the 2D image frame.

7. The method of claim 6, wherein if, within a predetermined time of detecting the 2D image frame, skeletal tracking information is detected, then it is determined that skeletal tracking information corresponding to the 2D image frame is available.

8. The method of claim 1, wherein the 2D image frame is a red green blue (RGB) 2D image frame and is received from a 2D RGB camera, wherein the normalized 2D image frame is a normalized RGB 2D image frame, the method further comprising:
converting the normalized RGB 2D image frame to a binary segmented image frame;
using the binary segmented image frame in a neural gas network to provide hand topology data corresponding to the binary segmented image frame and the normalized RGB 2D image frame;
using the hand topology data, determining hand features information in two dimensions of the hand in the normalized RGB 2D image frame; and
providing hand features information in three dimensions of the hand.

9. The method of claim 1, wherein the 3D image data comprises a 3D image frame, the method further comprising:
ordering data in the 3D image frame in order of increasing depth to produce an ordered set of data;
using the ordered set of data, creating a set of data clusters, wherein each data cluster of the set has a predetermined degree of continuity; and
for each data cluster in the set of data clusters, determining whether such data cluster represents a hand.

10. The method of claim 1, wherein the 2D image frame is a red green blue (RGB) 2D image frame and is captured by a RGB camera, further wherein the 3D image data is captured by an infrared (IR) camera.

11. A method comprising:
capturing a two dimensional (2D) red green blue (RGB) image frame, wherein the 2D RGB image frame includes an image of a hand and is captured using an RGB camera;
capturing three dimensional (3D) image data corresponding to the 2D RGB image frame, wherein the 3D image data corresponding to the 2D image frame is (a) skeletal tracking information corresponding to the 2D RGB image frame or (b) a 3D image frame corresponding to the 2D RGB image frame, wherein the 3D image data is captured using an infrared (IR) camera;
using the 3D image data corresponding to the 2D RGB image frame, producing a normalized RGB 2D image frame, wherein the normalized 2D RGB image frame is a scaled and rotated version of the 2D RGB image frame, wherein the producing is performed using a computer;
determining hand features information in two dimensions of the hand in the normalized 2D image frame; and
mapping the hand features information in two dimensions to hand features information in three dimensions.

12. The method of claim 11 further comprising:
clipping the 3D image data;
producing a clipped 3D image data, wherein the clipped 3D image data contains a 3D image of the hand in a 3D image frame of a predetermined size;
using the clipped 3D image data, producing a clipped 2D RGB image frame, wherein the clipped 2D RGB image frame is a 2D RGB image frame of a predetermined size and contains a 2D RGB image of the hand.

13. The method of claim 11 further comprising:
determining an aspect ratio of the hand in the 3D image data; and
using the aspect ratio, determining a palm plane for the hand,
wherein producing the normalized 2D RGB image frame comprises:
rotating the palm plane such that it is (a) parallel to a lens of the RGB camera and (b) perpendicular to a floor plane, wherein the floor plane is a plane defined by a floor of a location where the 2D RGB image frame was captured; and
scaling the 2D RGB image frame such that the image of the hand fits within a frame of a predetermined size.

14. The method of claim 11, wherein
if skeletal tracking information corresponding to the 2D RGB image frame is available, using the skeletal tracking information corresponding to the 2D RGB image frame, to produce the normalized 2D RGB image frame;
if skeletal tracking information corresponding to the 2D image frame is not available, but the 3D image frame corresponding to the 2D RGB image frame is available, using the 3D image frame corresponding to the 2D RGB image frame, to produce the normalized 2D RGB image frame.

15. The method of claim 14, wherein if, within a predetermined time of detecting the 2D RGB image frame, skeletal tracking information is detected, then it is determined that the skeletal tracking information corresponding to the 2D RGB image frame is available.

16. A non-transitory computer readable medium including computer executable code, which when executed on a computer, cause the computer to perform a method comprising:
receiving a two dimensional (2D) image frame;
receiving three dimensional (3D) image data corresponding to the 2D image frame;
using the 3D image data corresponding to the 2D image frame, transforming and scaling the 2D image frame, wherein the transforming and scaling results in a normalized 2D image frame, wherein the normalized 2D image frame is a scaled and transformed version of the 2D image frame;
determining hand features information in two dimensions of a hand in the normalized 2D image frame; and
mapping the hand features information in two dimensions to hand features information in three dimensions.

17. The non-transitory computer readable medium of claim 16, wherein the 3D image data corresponding to the 2D image frame is (a) skeletal tracking information corresponding to the 2D image frame or (b) a 3D image frame corresponding to the 2D image frame.

18. The non-transitory computer readable medium of claim 17, wherein the method further comprises:
    clipping the 3D image data;
    producing a clipped 3D image data, wherein the clipped 3D image data contains a 3D image of the hand in a 3D image frame of a predetermined size;
    using the clipped 3D image data, clipping the 2D image frame; and
    producing a clipped 2D image frame, wherein the clipped 2D image frame is a 2D image frame of a predetermined size and contains a 2D image of the hand.

19. The non-transitory computer readable medium of claim 16, wherein the 2D image frame includes a 2D image of the hand, further wherein the 3D image frame includes a 3D image of the hand, further wherein the method further comprises:
    calculating an aspect ratio of the hand in the 3D image data; and
    using the aspect ratio, determining a palm plane for the hand,
    wherein transforming the 2D image frame comprises rotating the palm plane such that it is (a) parallel to a lens of a camera with which the 2D image frame was captured and (b) perpendicular to a floor plane, wherein the floor plane is a plane defined by a floor of a location where the 2D image frame was captured, further wherein the scaling the 2D image frame comprises scaling the 2D image frame such that the 2D image of the hand fits within a frame of a predetermined size.

20. The non-transitory computer readable medium of claim 16, wherein, if skeletal tracking information corresponding to the 2D image frame is available, then the method comprises:
    using the skeletal tracking information corresponding to the 2D image frame, transforming and scaling the 2D image frame,
    wherein, if skeletal tracking information corresponding to the 2D image frame is not available, but a 3D image frame corresponding to the 2D image frame is available, then the method comprises:
    using the 3D image frame corresponding to the 2D image frame, transforming and scaling the 2D image frame.

21. The non-transitory computer readable medium of claim 20, wherein, if within a predetermined time of detecting the 2D image frame, skeletal tracking information is detected, then it is determined that the skeletal tracking information corresponding to the 2D image frame is available.

22. The non-transitory computer readable medium of claim 16, wherein the 2D image frame is a red green blue (RGB) 2D image frame and is received from a 2D RGB camera, wherein the normalized 2D image frame is a normalized RGB 2D image frame, the method further comprising:
    converting the normalized RGB 2D image frame to a binary segmented image frame;
    using the binary segmented image frame in a neural gas network to provide hand topology data corresponding to the binary segmented image frame and the normalized RGB 2D image frame;
    wherein determining the hand features information in two dimensions of the hand in the normalized 2D image frame comprises, using the hand topology data, determining hand features information in two dimensions of the hand in the normalized RGB 2D image frame; and
    providing hand features information in three dimensions of the hand.

* * * * *